May 21, 1940.          R. W. WIESEMAN          2,201,845
DYNAMOELECTRIC MACHINE
Filed Dec. 13, 1938
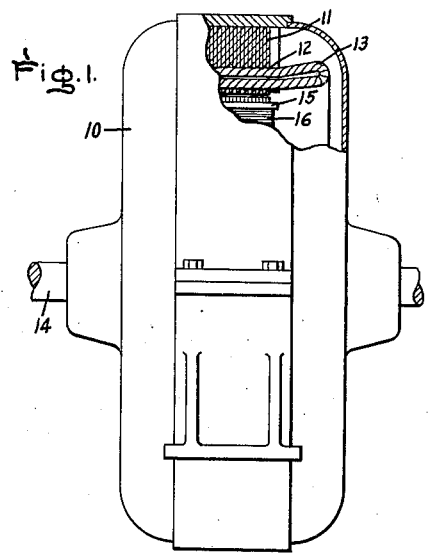
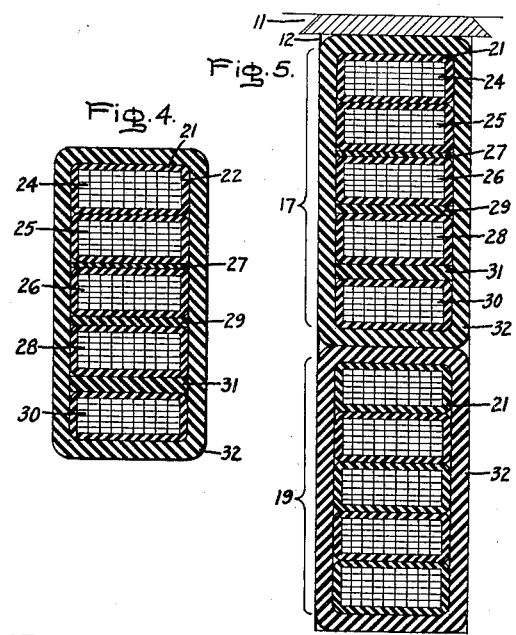
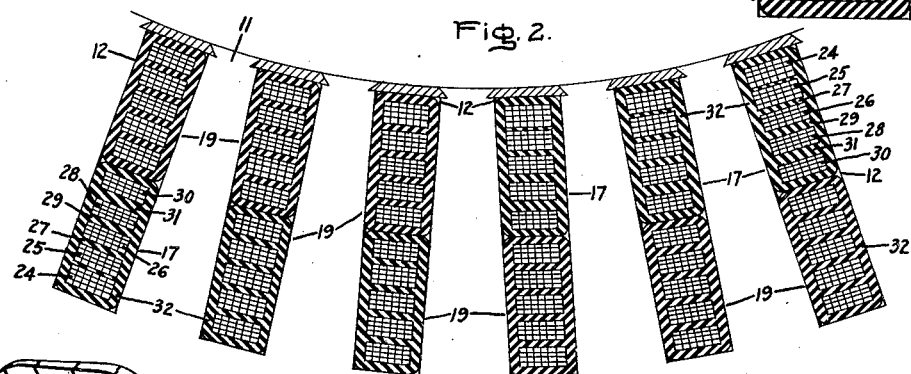
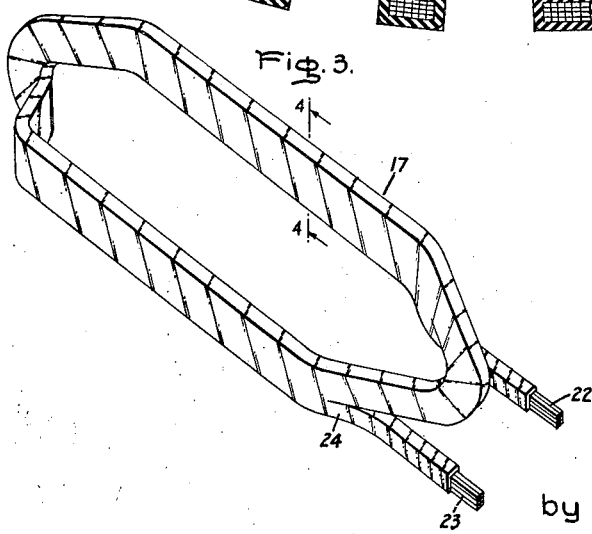
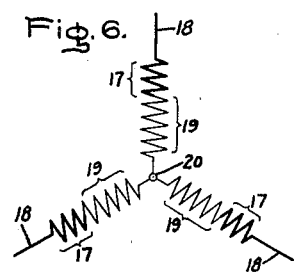
Inventor:
Robert W. Wieseman,
by Harry E. Dunham
His Attorney.

Patented May 21, 1940

2,201,845

UNITED STATES PATENT OFFICE 2,201,845

DYNAMOELECTRIC MACHINE

Robert W. Wieseman, Schenectady, N. Y., assignor to General Electric Company, a corporation of New York Application December 13, 1938, Serial No. 245,452

10 Claims. (Cl. 171—252)

My invention relates to dynamoelectric machines and more particularly to polyphase windings for such machines.

An object of my invention is to provide an improved dynamoelectric machine winding and insulation for such a winding.

Further objects and advantages of my invention will become apparent and my invention will be better understood from the following description referring to the accompanying drawing, and the features of novelty which characterize my invention will be pointed out with particularity in the claims annexed to and forming part of this specification.

In the drawing, Fig. 1 illustrates a dynamoelectric machine partly broken away provided with a polyphase winding embodying my invention; Fig. 2 is an enlarged partial sectional view taken transversely of the stationary member winding shown in Fig. 1; Fig. 3 is a perspective view of one of the coils of the machine winding shown in Figs. 1 and 2; Fig. 4 is an enlarged sectional view taken along line 4—4 of Fig. 3; Fig. 5 is an enlarged sectional view of one of the slots of the winding shown in Fig. 2; and Fig. 6 is a schematic illustration of the arrangement of the stationary member polyphase winding shown in Fig. 1.

Referring to the drawing, I have shown a dynamoelectric machine having a stationary member 10 provided with a laminated core 11 of magnetic material which is formed with a plurality of winding slots 12 in which are arranged the coil sides of a polyphase stationary member winding 13. The dynamoelectric machine is excited by a rotatable member mounted on a shaft 14 and provided with salient pole pieces 15 which are adapted to be excited by field exciting windings 16. The polyphase dynamoelectric machine which is illustrated is of the high voltage type which is generally used for generating polyphase currents for high voltage transmission systems. Such generators are often subject to the danger of injury by surges of abnormally high electrical potential which may come over the transmission line arising from atmospheric lightning, accidental grounds, improper manipulation of switches, or some other external cause. When such a surge or impulse voltage enters an armature winding, the voltage distributes itself between the turns of the winding coils in an inverse ratio to the capacities of the electrostatic capacity between the coil turns. Furthermore, it has been found that such impulse voltages become dampened as they progress through the turns of a coil of such a machine. With such a condition, if the insulation strength and spacing between conductor turns of a coil are uniform throughout the coils adjacent the terminals of a machine winding, the insulation between the conductor turns nearest the terminals of the machine winding will be subjected to an abnormally high impulse voltage and the insulation may break down between these turns, resulting in a short circuit or ground and possibly permanent damage to the machine winding. In order to overcome this undesirable effect of surge voltages upon the windings of this type machine, I arrange the insulation between coil side turns so as to provide a substantially uniform voltage distribution between all of the conductor turns of each coil. As has been stated, such impulse voltages become dampened as they progress into the machine winding, and it is, therefore, not necessary to use a special insulating arrangement on all of the coils of the machine.

As shown in Fig. 6, the special insulating arrangement is used only on the coils 17 which are nearest the terminals 18 of the three phase Y-connected winding, while the coils 19 which are connected more adjacent to the neutral point 20 of the three phase Y-connected machine are provided with the conventional uniform insulation between turns of each coil.

In order to obtain the above desired uniform distribution of the impulse therein, voltage throughout the coils next adjacent to the machine winding terminals, I provide a substantially uniform insulation 21 around each turn of a laminated coil conductor 22, and as more clearly shown in Figs. 2, 4, and 5, the insulation between adjacent conductor turns is varied in thickness and arranged to provide a progressively increasing electrostatic capacity between adjacent coil turns. As the terminal 23 is the one nearest an adjacent machine winding terminal 18, it is desirable that the insulation between the conductor turn 24 and the adjacent conductor turn 25 should be the minimum used and provide the minimum spacing between these two turns of this coil. As shown in Fig. 2, this side of the coil 17 is represented as the lower coil in the last slot 12 of the core 11 on the left side of this figure. The other coil side of this coil is represented as the coil side in the upper portion of the first slot 12 on the right-hand side of Fig. 2. Since the impulse voltage entering an armature winding distributes itself between the turns of a coil in an inverse ratio to the electrostatic capacities between coil turns, the insulation between the first turn 24 and the second turn 25 is merely the insulation of uniform thickness which extends about all of the conductor forming the coils of the winding. Between the second turn 25 and the third turn 26, I arrange an additional strip of insulation 27 in order to increase the electrostatic capacity between these coils in accordance with the position of this insulation with respect to the coil turn nearest the adjacent machine winding terminal. Similarly, between the third turn 26 and the fourth turn 28 of the winding, an additional strip of insulation 29 of greater thickness than the strip 27 is arranged. The insulation between the fourth turn 28 and the fifth turn 30 of the coil 17 is also made correspondingly thicker by the use of insulating strip 31 arranged between these turns of the coil. In this manner, the insulation between adjacent conductor turns of the coils 17 is graded in accordance with the relative position of the insulation with respect to the terminal coil turn of the respective coil. The coil insulation 32 which is arranged about the entire coil is of uniform thickness as in the conventional type coil, and as shown in Figs. 2 and 5, the coils 19 also are provided with a substantially uniform insulation between adjacent turns of the coils. It is desirable that several of the coils adjacent each of the machine terminals should be provided with the above graded insulation between coil turns, and it is particularly desirable that at least the one coil of each phase of the winding which is next adjacent the machine winding terminal should be insulated in this manner.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States is:

1. An electric machine having a winding formed of a plurality of coils, each of said coils having a plurality of conductor turns, and means including insulation between said coil conductor turns of at least one of said coils having diverse insulation strengths between different ones of said turns for providing a progressively varying electrostatic capacity between adjacent coil turns and for producing a substantially uniform impulse voltage distribution between all of the turns of said coil.

2. An electric machine having a winding formed of a plurality of coils, each of said coils having a plurality of conductor turns, terminals for said machine winding, and insulation between said coil conductor turns, said insulation between the conductor turns of at least each of said coils next adjacent said machine winding terminals being arranged to provide an increasing electrostatic capacity between adjacent coil turns graded from the coil turn nearest the adjacent machine winding terminal to the turn adjacent the other end of each respective coil.

3. A dynamoelectric machine having a core member with winding slots, a winding having a plurality of coils with coil sides in said winding slots, each of said coil sides being formed of a plurality of turns, and insulation between said coil side turns having progressively diverse insulation strengths between different ones of said turns.

4. A dynamoelectric machine having a core member, a winding having a plurality of coils arranged about said core member, each of said coils being formed of a plurality of conductor turns, terminals for said machine winding, and insulation between said coil conductor turns, said insulation between the conductor turns of at least one of said coils being arranged to provide an increasing electrostatic capacity between adjacent coil turns graded from the coil turn nearest the adjacent winding terminal to the turn adjacent the other end of said coil.

5. A dynamoelectric machine having a core member, a winding having a plurality of coils arranged about said core member, each of said coils being formed of a plurality of conductor turns, terminals for said machine winding, and insulation between said coil conductor turns, said insulation between the conductor turns of at least one of said coils being of increasing thickness between adjacent coil conductor turns graded from the coil turn nearest the adjacent machine winding terminal to the turn adjacent the other end of said coil.

6. A dynamoelectric machine having a core member, a winding having a plurality of coils arranged about said core member, each of said coils being formed of a plurality of conductor turns, a terminal for said machine winding, and insulation between said coil conductor turns, said insulation between the conductor turns of the nearest one of said coils to the winding terminal being arranged to provide an increasing electrostatic capacity between adjacent coil turns graded in accordance with the relative position of the insulation with respect to the coil turn nearest the adjacent machine winding terminal.

7. A dynamoelectric machine having a core member with winding slots, a winding having a plurality of coils with coil sides in said winding slots, each of said coil sides being formed of a plurality of turns, machine winding terminals, and insulation between said coil side turns having diverse insulation strengths between different ones of said turns, said insulation being arranged to provide an increasing electrostatic capacity between adjacent coil side turns graded in accordance with the relative position of the insulation with respect to the terminal coil turn of the respective coils nearest an adjacent machine winding terminal.

8. A dynamoelectric machine having a core member, a winding having a plurality of coils arranged about said core member, each of said coils being formed of a plurality of conductor turns, terminals for said machine winding, insulation between said coil conductor turns, said insulation between the conductor turns of at least one of said coils being arranged to provide an increasing electrostatic capacity between adjacent coil turns graded from the coil turn nearest the adjacent machine winding terminal to the turn adjacent the other end of said coil, and substantially uniform insulation about each of said coils.

9. A dynamoelectric machine having a core member, a winding having a plurality of coils arranged about said core member, each of said coils being formed of a plurality of conductor turns, terminals for said machine winding, and insulation between said coil conductor turns, said insulation between the conductor turns of at least one of said coils being arranged to provide an increasing electrostatic capacity between adjacent coil turns graded from the coil turn nearest the adjacent machine winding terminal to the turn adjacent the other end of said coil, said insulation between the conductor turns of other coils of said winding being substantially uniform.

10. A dynamoelectric machine having a core member, a winding having a plurality of coils arranged about said core member, each of said coils being formed of a plurality of turns, a terminal for said machine winding, and insulation between said coil turns, said insulation being of increasing thickness between adjacent coil turns graded in accordance with the relative position of said insulation with respect to the turn of each of said coils nearest said machine terminal.

ROBERT W. WIESEMAN.